United States Patent [19]

Knapp et al.

[11] Patent Number: 5,826,072

[45] Date of Patent: Oct. 20, 1998

[54] PIPELINED DIGITAL SIGNAL PROCESSOR AND SIGNAL PROCESSING SYSTEM EMPLOYING SAME

[75] Inventors: David J. Knapp; Horace C. Ho, both of Austin, Tex.

[73] Assignee: Oasis Design, Inc.

[21] Appl. No.: 558,636

[22] Filed: Nov. 13, 1995

[51] Int. Cl.$^6$ ......................................... G06F 9/00
[52] U.S. Cl. ..................... 395/567; 711/214; 395/800.35
[58] Field of Search .................. 395/394, 567, 395/377, 874, 421.04, 800.25

[56] References Cited

U.S. PATENT DOCUMENTS

| | | |
|---|---|---|
| 4,542,354 | 9/1985 | Robinton et al. . |
| 4,675,806 | 6/1987 | Uchida ..................................... 395/377 |
| 4,851,841 | 7/1989 | Sooch . |
| 4,878,197 | 10/1989 | Nay et al. ............................... 395/874 |
| 4,916,606 | 4/1990 | Yamaoka et al. ....................... 395/394 |
| 4,920,544 | 4/1990 | Endo et al. . |
| 4,943,807 | 7/1990 | Early et al. . |
| 5,061,928 | 10/1991 | Karema et al. . |
| 5,148,166 | 9/1992 | Ribner . |
| 5,303,358 | 4/1994 | Baum ...................................... 395/567 |

OTHER PUBLICATIONS

Franca, et al., "Design of Analog —Digital VLSI Circuits for Telecommunications and Signal Processing ", $2^{nd}$ Edition , Prentice Hall, pp. 251–288.

Hogenauer, "An Economical Class of Digital Filters for Decimation and Intrerpolation", *IEEE Trans. on Acoustincs, Speech and Signal Processing*, vol. ASSP–29, No. 2 (Apr. 1981).

Chu, et al. "Multirate Filter Designs Using Comb Filters", *IEEE Trans. on Circuits and Systems*, vol. CAS–31, pp. 405–416 (Nov. 1994).

Moussavi, et al., "High–Order Signle–Stage Single–Bit Oversampling A/D Converters Stabilized with Local Feedback Loops", *IEEE Trans. on Circuits and Systems*, vo.1 41, No. 1, pp. 19–25 (Jan 1994).

Crochiere, et al., "Interpolation and Decimation of Digital Signals —A Tutorial Review", *Proc. IEEE*, vol. 69, pp. 417–448 (Mar. 1981).

Pohlmann, "Principles of Digital Audio", $2^{nd}$ Edition, SAMS, (Carmel, Indiana, 1991) pp. 375–415.

*Primary Examiner*—Parshotam S. Lall
*Assistant Examiner*—Patrica L. Winder
*Attorney, Agent, or Firm*—Kevin L. Daffer; Lawrence J. Merkel; Conley, Rose & Tayon

[57] ABSTRACT

Two embodiments of a digital signal processor are described. Each embodiment is configured with an instruction processing pipeline including an execute-write pipeline stage. When an instruction reaches the execute-write pipeline stage, the instruction is executed and the corresponding result is written to the specified destination. Additionally, the execute-write stage maintains a relatively short pipeline. One embodiment described herein employs an instruction set in which the destination of an instruction may be encoded within a subsequent instruction. The number of bits utilized to encode a particular instruction is reduced by the number of bits that would have specified the destination.

12 Claims, 6 Drawing Sheets

|  | Clk 1 | Clk 2 | Clk 3 | Clk 4 | Clk 5 | Clk 6 | Clk 7 | Clk 8 | Clk 9 |
|---|---|---|---|---|---|---|---|---|---|
| INS 0 | F | R1 | R2 | EWr | | | | | |
| INS 1 | | F | R1 | R2 | EWr | | | | |
| INS 2 | | | F | R1 | R2 | EWr | | | |
| JMP | | | | F | R1 | R2 | EWr | | |
| INS 3 | | | | | | F | R1 | R2 | EWr |
| INS 4 | | | | | | | | | |

FIG. 9

PIPELINED DIGITAL SIGNAL PROCESSOR AND SIGNAL PROCESSING SYSTEM EMPLOYING SAME

BACKGROUND OF THE INVENTION

1. Field of the Invention

This invention relates to digital signal processors and, more specifically, to pipelined digital signal processors having an execute-write pipeline stage.

2. Description of the Relevant Art

Digital signal processors (DSPs) are becoming prevalent in the electronics industry. Typical products which utilize DSPs include: computers, radios, digital telephones, modems, image processors, etc. New and expanded applications for DSPs are continuously being created.

A "digital signal" processed by a DSP is a signal capable of conveying a discrete number of magnitudes (or values). Conversely, an "analog signal" is a signal capable of conveying an infinite number of values. A digital signal may be created from an analog signal through sampling and quantizing the analog signal. Sampling refers to periodically capturing a value from a signal. The captured value becomes the value of the digital signal during that sample period. Such a captured value is typically referred to as a sample. Quantizing refers to approximating a sample with a value that may be represented on the digital signal. For example, a sample may lie between two values characterized upon the digital signal. The value nearest (in absolute value) to the sample may be used to represent the sample. Or, the sample may be represented by the lower of the two values between which the sample lies. After quantization, a sample from an analog signal may be conveyed on the digital signal.

Generally speaking, a DSP transforms a received digital signal to an output digital signal. The transformation may involve filtering out undesired portions of the received digital signal. Alternatively, the transformation may be a more complex function which reshapes the received digital signal into an output digital signal which is substantially different from the received digital signal. Such transformations may be mathematically represented as fast Fourier transforms (FFTs), discrete Fourier transforms (DFTs), or Z transforms. A discussion of these mathematical representations may be found in the publication "Principles of Digital Audio, Second Edition" by Pohlmann, SAMS, Carmel, Ind., 1991 (herein incorporated by reference).

As mentioned above, one widely utilized application of DSPs is filtering. As will be appreciated by those of skill in the art, an analog signal may be represented as a sum of a plurality of sinusoidal signals. Each sinusoidal signal oscillates at a particular and unique frequency. Filtering is used to remove certain frequencies from a received signal while leaving other frequencies intact. Exemplary filters which are often implemented in DSPs are finite impulse response filters, transversal filters, and infinite impulse response filters. A finite impulse response filter is a filter in which an input sample produces a finite number of output samples. After the finite number of samples expires, the filter output is no longer affected by that particular input sample. An infinite impulse response filter is a filter in which an input sample produces an infinite number of output samples. Therefore, once a sample is input to an infinite impulse response filter, the output samples are continuously affected by that input sample (as long as the filter remains in use). Transversal filters are filters in which a certain number of past samples are used along with the current sample to create each output sample.

Other exemplary signal transformations that may be performed by a DSP include digital delay, digital reverbation, and signal enhancement. The samples of a digital signal which is transformed through digital delay are each delayed by a specified number of samples. In other words, each output sample is an input sample previously provided to the DSP. Digital reverbation refers to recreating an acoustical environment. A digital audio signal (representing a sound) may be transformed by digital reverbation into an output signal representing the sound and its reflections in the specified acoustical environment. Signal enhancement refers to improving the quality of a signal according to some particular measurement. For example, signal enhancement may be performed upon a digital audio signal to remove an echo from the sound. Many other signal transformations are implemented within DSPs. For sake of brevity, only the above exemplary signal transformations have been discussed. However, it is understood that DSPs perform any and all types of signal transformations associated with digital audio processing, beyond the limited set of applications described above.

DSPs typically employ an instruction set and hardware design which supports programming signal transformations. A program is a list of instructions which, when executed, performs a particular operation (i.e. a signal transformation). Programs executing on DSPs are often "real-time" programs. Real-time programs are programs which must execute within a certain time interval. Conversely, ordinary programs may execute in any amount of time. Regardless of whether an ordinary program executes in a large period of time or a small period of time, the result of executing the program is the same. However, if real-time programs are executed in an amount of time longer than the specified time interval, then they may no longer compute the same result. Programs executing on a DSP are real-time programs in that the instructions are manipulating samples of a digital signal. If the program cannot complete manipulating a sample before the next sample is provided, then the program will eventually begin to "lose" samples. A lost sample does not get processed, and therefore the output signal of the DSP no longer contains all of the information provided in the input signal to the DSP.

A DSP may be programmed to perform a particular signal transformation. The number of instructions required to perform the particular transformation is relatively fixed. Therefore, if a DSP is to be used to perform the transformation for a particular signal, it must be capable of executing this relatively fixed number of instructions before the next sample is provided on the particular input signal. A measure of a DSP's ability to perform complex operations is its MIPS (Millions of Instructions Per Second) value. MIPS measures the number of instructions per second executed by the DSP. A first DSP characterized by twice the MIPS of a second DSP is able to perform a particular transformation upon a signal having twice as many samples per second as the second DSP. Or, the first DSP is capable of performing a transformation requiring twice as many instructions per sample as the second DSP is capable of performing. A DSP characterized by higher MIPS than that previously attainable is therefore desirable.

Besides considering the MIPS that a DSP is characterized by, an additional consideration to the design of DSPs is cost. DSPs must be inexpensive in order to enhance their use for particular applications. One important cost factor is the silicon area needed to manufacture the DSP. DSPs which are manufactured on a relatively small silicon die are typically less expensive than a DSP which requires a larger silicon die. Therefore, an easily manufacturable, low cost DSP is also desirable.

DSPs often include memory devices to store instructions and samples. Of the transistors implementing a DSP, it is often the case that more transistors are used to form the memory devices than those used to form other DSP circuitry—in some cases, the transistor ratio can exceed 2:1. In order to minimize cost, it is therefore important to minimize the size of the included memory devices. However, the size of the memory devices directly affects the MIPS characterization of a DSP. Memory devices configured on the same silicon substrate as the DSP may be accessed significantly faster than memories configured on separate substrates. Therefore, large memory devices configured on the same silicon substrate as the DSP are desired. In particular, instruction memory must be optimized so that a large number of instructions may be stored therein. These instructions are more quickly accessible, as compared to memory devices configured separate from the DSP.

Die area may be maintained while increasing the effective size of the instruction memory by decreasing the size of the instructions (i.e. the number of bits of memory required to represent an instruction). One method of decreasing the size of an instruction is to encode the information in as few bits as possible. Unfortunately, encoding instructions requires complicated decoding circuitry to determine which of the instructions within the instruction set is currently being executed by the DSP. Such decoding circuitry may require a large silicon area and/or a large amount of time. The large silicon area adversely affects the cost of the DSP, while the large amount of time lowers the MIPS potential of the DSP. A cost-effective, high performance instruction set solution is therefore needed to enhance existing DSP function.

SUMMARY OF THE INVENTION

The problems outlined above are in large part solved by a digital signal processor (DSP) in accordance with the present invention. Two embodiments of the DSP are described. Each embodiment is configured with an instruction processing pipeline for overlapping the processing of instructions, and each pipeline includes an execute-write pipeline stage. When an instruction reaches the execute-write pipeline stage, the instruction is executed and the corresponding result is written to the specified destination. By employing pipelining, a higher frequency clock cycle may be achieved then would otherwise be possible while maintaining a one instruction per clock cycle throughput. Therefore, the MIPS characterization of the present DSP may be substantially higher than a non-pipelined DSP.

The execute-write stage avoids the deleterious effects that pipelining may engender by maintaining a relatively short pipeline. In particular, the number of bubbles created in the pipeline when a jump instruction is executed is lower than if the pipeline were configured with a separate execute stage and write stage (such as those present in conventional instruction processing pipelines of typical microprocessor architectures). Since bubbles in the pipeline decrease performance, the pipeline containing the execute-write stage enables higher performance than more conventional pipelines.

Another advantage of one embodiment described herein is an instruction set in which the destination of an instruction may be encoded within a subsequent instruction. The number of bits utilized to encode a particular instruction is advantageously reduced by the number of bits that would have specified the destination. Therefore, a smaller instruction memory may be included on the same substrate as the present DSP while retaining similar performance characteristics of a conventional DSP embodying a larger memory. Advantageously, a smaller die area may be achieved by the DSP hereof without incurring a corresponding decrease in performance. Smaller die area often leads to decreased cost, thereby allowing a broader, more diverse, set of applications for the present DSP.

Broadly speaking, the present invention contemplates a DSP configured to execute a plurality of instructions wherein a destination for a result of executing one of said plurality of instructions is specified by a subsequent one of said plurality of instructions. The present invention further contemplates a pipelined DSP comprising an execution unit and a memory. The execution unit is coupled to execute a plurality of instructions and produce a corresponding plurality of results. Coupled to the execution unit, the memory is adapted for storing the plurality of results. Additionally, the memory is configured to write one of the plurality of results during a clock cycle in which the execution unit is producing the same one of the plurality of results.

The present invention still further contemplates a signal processing system comprising a signal interface unit configured to produce a digital output signal, and a DSP coupled to the signal interface unit to receive the digital output signal. The DSP comprises an execution unit and a memory.

The present invention yet further contemplates an instruction processing pipeline for a DSP comprising a fetch stage configured to fetch an instruction. An execute-write stage is presented to execute the instruction to produce a result, and to write a destination of the instruction with the result.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
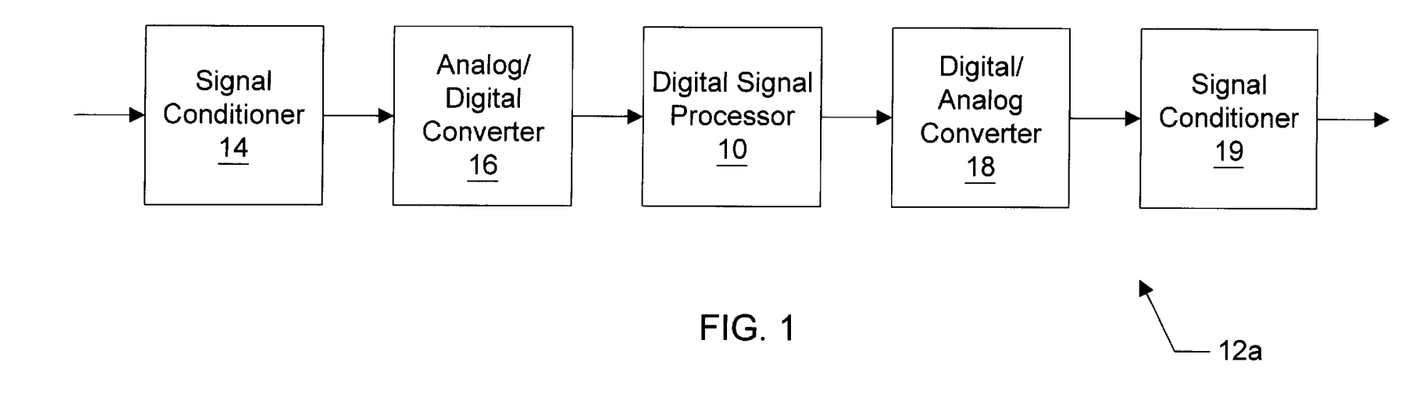
FIG. 1 is a block diagram of a signal processing system according to the present invention.

Turning now to FIG. 1, a block diagram of one embodiment of a signal processing system 12a including a DSP 10 according to the present invention is shown. One or more analog signals are provided by an external source (not shown) to a signal conditioner 14. Signal conditioner 14 is configured to perform certain preprocessing functions upon the analog signals. Exemplary preprocessing functions may include mixing several of the analog signals together, filtering, amplifying, etc. An analog to digital converter 16 is coupled to receive the preprocessed analog signals from signal conditioner 14 and to convert the preprocessed analog signals to digital signals consisting of samples, as described above. The samples are taken according to a sampling rate determined by the nature of the analog signals received by signal conditioner 14. DSP 10 is coupled to receive digital signals at the output of analog to digital converter 16. DSP 10 performs the desired signal transformation upon the received digital signals, producing one or more output digital signals. A digital to analog converter 18 is coupled to receive the output digital signals from DSP 10. Digital to analog converter 18 converts the output digital signals into output analog signals. The output analog signals are then conveyed to a second signal conditioner 19. Second signal conditioner 19 performs post-processing functions upon the output analog signals. Exemplary post-processing functions are similar to the preprocessing functions listed above. It is noted that various configurations of signal conditioners 14 and 19, analog to digital converter 16, and digital to analog converter 18 are well known. Any suitable configuration of these devices may be coupled into a signal processing system 12a with DSP 10.

Figure 2:
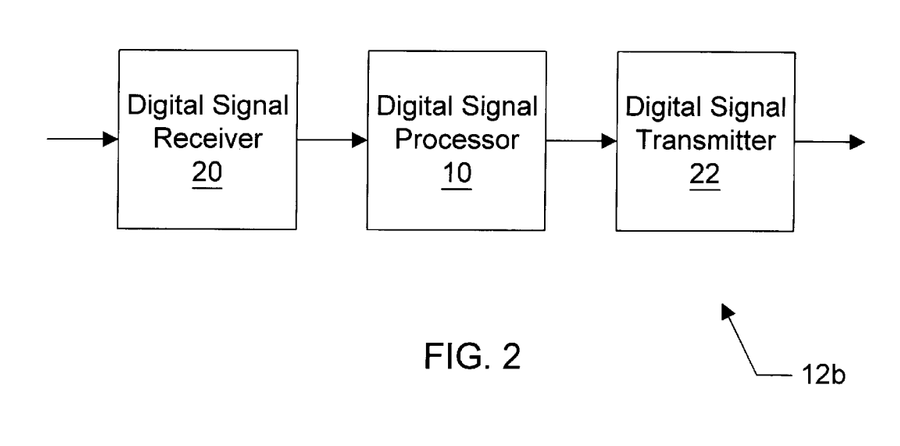
FIG. 2 is a block diagram of another signal processing system according to the present invention.

Turning next to FIG. 2, another embodiment of signal processing system 12b is shown. In this embodiment, a digital receiver 20 is configured to receive one or more digital signals and to convey the received digital signals to digital signal processor 10. As with the embodiment shown in FIG. 1, DSP 10 performs the desired signal transformation upon the received digital signals to produce one or more output digital signals. Coupled to receive the output digital signals is a digital signal transmitter 22. In one exemplary application, signal processing system 12b is a digital audio device in which digital receiver 20 conveys to DSP 10 digital signals indicative of data stored on a digital storage device (not shown). DSP 10 then processes the digital signals and conveys the resulting output digital signals to digital transmitter 22. Digital transmitter 22 then causes values of the output digital signals to be stored on a second digital storage device (not shown). Digital receiver 20 and digital transmitter 22, which perform the stated functions, are of common design and are known to the skilled artisan.

Figure 3:
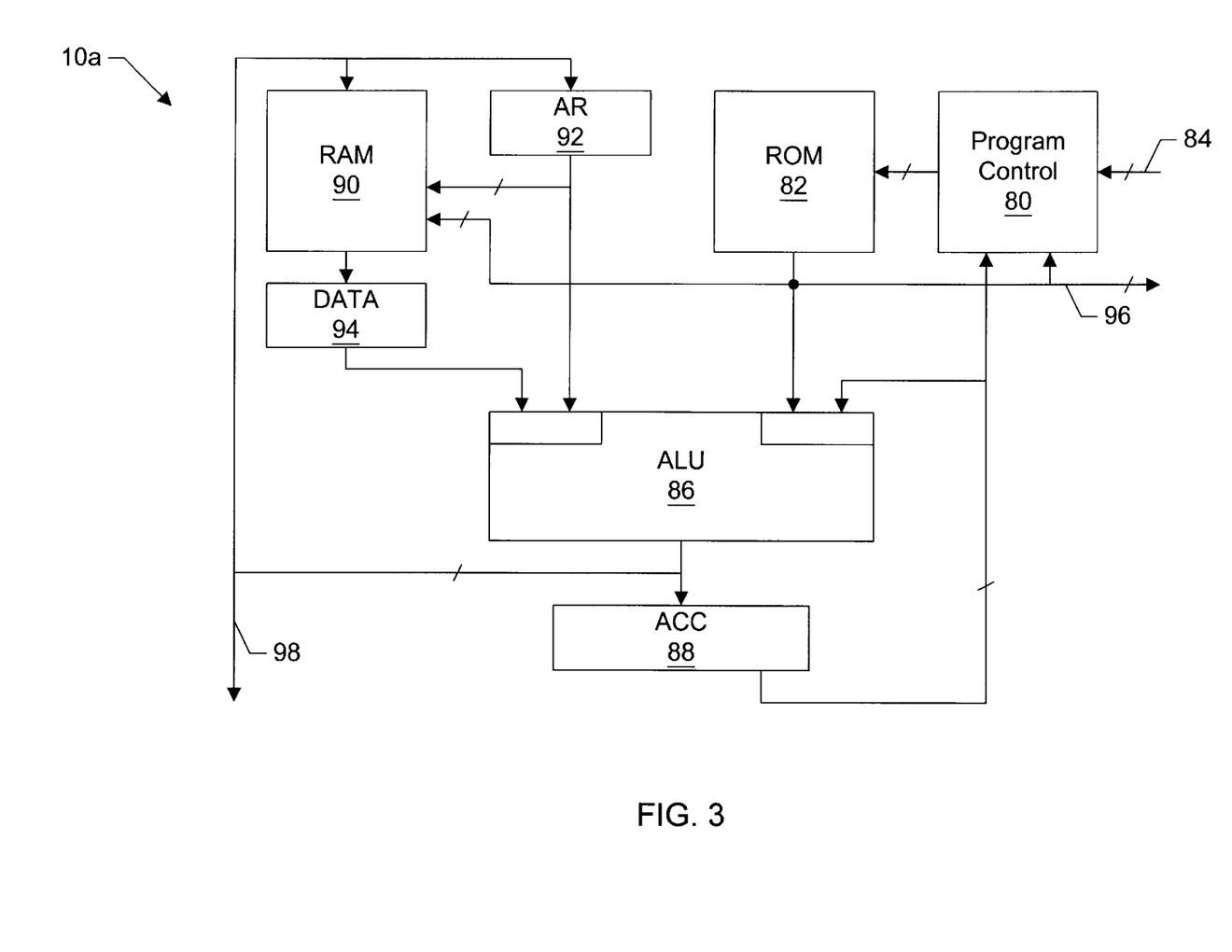
FIG. 3 is a block diagram of an exemplary embodiment of a DSP according to the present invention.

Turning next to FIG. 3, a block diagram of an embodiment of DSP 10a is shown. For simplicity, only portions of DSP 10a pertaining to the present invention are shown. DSP 10a is configured with a program control unit 80 configured to fetch instructions from an instruction memory 82. Instruction memory 82 is a read-only memory (ROM) configured to store up to 2000 instructions. Each instruction is fixed-length. Included in program control unit 80 is the program count (PC) register, the status register, and interrupt control logic. Interrupt request signals 84 are coupled to the interrupt control logic within program control unit 80. An interrupt occurs when an external electronic device (an "interrupt source") activates one of interrupt request signals 84 and an associated bit stored in an interrupt enable register (not shown) coupled to input/output buses 96 and 98 is set. Instructions stored at a specific address within instruction memory 24 are executed when an interrupt occurs, and then program execution is returned to the point where the program was interrupted. In one embodiment, the status register includes a zero bit indicative of a zero result from an operation, a negative bit indicative of a negative result from an operation, and a carry bit indicative of a carry from an operation.

Instructions read (or "fetched") from instruction memory 82 are conveyed to an execution unit comprising arithmetic/logic unit (ALU) 86. During a clock cycle subsequent to the instruction fetch, the instruction is executed and the result written to the destination specified by the instruction. A "clock cycle" is the time interval during which portions of DSP 10a perform their logical functions. At the end of each clock cycle, the values produced are stored into storage devices such as memory or registers. A clock cycle is defined by one rise and one fall of a clock signal which is conveyed to memory and registers within DSP 10a. Storage devices are configured to capture their values on the rising or falling edge of the clock signal.

The "destination" of an instruction is the storage device in which the result of executing the instruction is to be stored, as indicated by the instruction encoding. The destination may be an accumulator register 88, a storage location in a data memory 90, or an address register 92. In one embodiment, data memory 90 is a random access memory (RAM) comprising 256 bytes of storage. Additionally, if the destination of an instruction is not data memory 90, then the instruction may specify a storage location within data memory 90 to copy data into a data register 94. A subsequent instruction may use the contents of data register 94 as an operand. A "subsequent instruction" is an instruction stored in byte(s) of instruction memory 82 contiguous to the bytes storing the current instruction. The subsequent instruction is intended to be executed during a clock cycle subsequent to a clock cycle in which the current instruction is executed. It is noted that a destination is an operand of an instruction, similar to a source operand. However, the destination specifies the storage location to store a result, as opposed to a storage location from which to draw an input value (as a source operand specifies).

ALU 86 is configured to receive a "left" operand and a "right" operand. The left operand may be the data stored in data register 94, or the address register 92. The right operand may be immediate data from the instruction or the value stored in accumulator register 88. ALU 86 is configured to perform arithmetic operations (such as addition and subtraction) as well as logical operations (such as AND and OR operations). Instructions within the instruction set of DSP 10a are defined to perform various operations with respect to the left and right operands of ALU 86.

DSP 10a supports several types of operand addressing including: immediate addressing, direct addressing, and indirect addressing. Operand addressing refers to locating an operand value for an instruction from among the storage devices in DSP 10. Immediate addressing is one type of operand addressing wherein the operand value is stored as part of the associated instruction within instruction memory 82. Immediate addressing is supported by selecting data from the instruction as the right operand. By conveying data from the instruction to an input port of data memory 90, data bytes to be copied to data register 94 may be specified directly by the instruction. Thus, direct addressing is supported. Direct addressing is the form of operand addressing in which an instruction specifies the operand address via bytes stored with the instruction in instruction memory 82. The address stored within the instruction is used to select a storage location within data memory. Indirect addressing, on the other hand, is specified by an instruction which indicates that the address of an operand should be taken from a register. The value stored in the specified register is used to select a storage location within data memory 90. Indirect addressing is supported by conveying the contents of AR register 92 to an input port of data memory 90. Data bytes stored at an address indicated by AR register 92 may thereby be read and stored in data register 94.

Both the direct and indirect addressing options cause data to be copied from data memory 90 to data register 94. The data addressed by an instruction using either indirect or direct addressing is not used as an operand for that instruction. Instead, a subsequent instruction may use the data as an operand.

Program control unit 80 implements an interrupt structure. It is noted that any interrupt structure is suitable for DSP 10. In one embodiment, the interrupt structure includes a pair of interrupt levels (a high priority interrupt level and a low priority interrupt level). Each interrupt request signal 84 is associated with either a high or low interrupt level. When either interrupt level is signaled, the program count register and status register are pushed onto a hardware stack within program control unit 80. As will be appreciated by those skilled in the art, a stack is a storage device having the property that the last datum stored into the device is the first item to be read out. A "push" involves storing a datum on the stack, and a "pop" involves removing a datum from the stack.

When a high priority interrupt is signaled, the values in address register 92, data register 94, and accumulator register 88 are copied to shadow registers in addition to the pushing of the program counter and status register onto the stack. Therefore, these registers need not be saved by the interrupt service routine. An interrupt service routine is a sequence of instructions stored at the interrupt vector address which is loaded into the program count register when the interrupt is signaled. Low priority interrupts must save these values when the interrupt service routine is entered, if the values are changed by the interrupt service routine.

Communication with other electronic devices is effected through an input/output bus represented by address bus 96 and data bus 98. Address bus 96 is used to convey addresses between DSP 10a and such electronic devices, while data bus 98 is used to convey data between accumulator register 88 and such electronic devices. Exemplary electronic devices which may be coupled to address bus 96 and data bus 98 are analog to digital converter 16 or digital to analog converter 18 (shown in FIG. 1). Additional exemplary electronic devices which may be coupled to address bus 96 and data bus 98 are digital signal transmitter 22 and digital signal receiver 20 (shown in FIG. 2). Registers may also be coupled to input/output buses 96 and 98, such as the aforementioned interrupt enable register. Additionally, an address paging register may be coupled to input/output buses 96 and 98. In one embodiment, the address paging register includes four bits which identify the data stored within data memory 90 as belonging to one of sixteen data pages.

Figure 4:
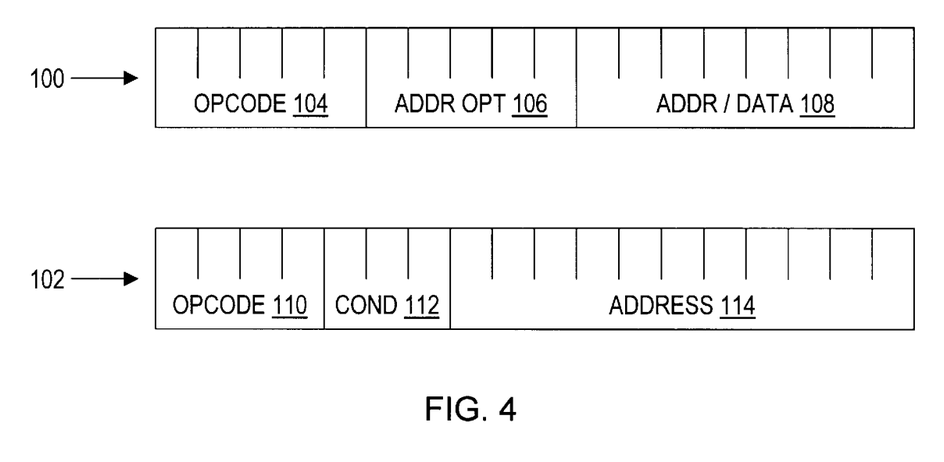
FIG. 4 is a diagram of instruction formats for the DSP shown in FIG. 3.

Turning next to FIG. 4, exemplary instruction encodings for an instruction set implemented in DSP 10a are shown. A first encoding 100 is used for most instructions, while a second encoding 102 is used for jump instructions. First encoding 100 is divided into an opcode field 104, an address options field 106, and an address/data field 108. Opcode field 104 is five bits wide and forms an operation code (or opcode) which identifies each instruction in the instruction set. Address options field 106 is five bits wide and specifies the source operands and destination for each instruction. Address options field 106 is further divided into two subfields (not shown). The first subfield is a sources subfield which is two bits wide. The second subfield is a destination subfield which is 3 bits wide. Address/data field 108 is 8 bits wide, and is used to store immediate data or a direct address for an instruction. Second encoding 102 is divided into a four bit opcode field 110, a three bit condition field 112, and an address field 114. Condition field 112 is used to identify which bit or bits in the status register or accumulator register 88 determine whether the jump instruction changes the program counter address or not. Address field 114 identifies the jump address.

Table 1 indicates one exemplary encoding for the opcode field 104 of first encoding 100.

TABLE 1

| Opcode Field 104 Encoding | |
|---|---|
| Opcode | Instruction |
| 00000 | add |
| 00001 | addc |
| 00010 | sub |
| 00011 | subc |
| 00100 | xor |
| 00101 | or |
| 00110 | and |
| 00111 | reserved |
| 01000 | inc |
| 01001 | shift right |
| 01010 | dec |
| 01011 | shift left |
| 01100 | move |
| 01101 | clear |
| 01110 | I/O read or write (see Table 3) |
| 01111 | return, reset, etc. (see Table 3) |

Each instruction within the exemplary instruction set will now be described briefly. The bits of the status register will be abbreviated in this description as follows: the zero bit will be Z; the negative bit will be N; and the carry bit will be C.

The add instruction adds the left and right operands, storing the result in the specified destination. Similarly, the addc instruction adds the left operand, the right operand, and the C bit from the status register. The result is stored in the specified destination. The sub instruction subtracts the left operand from the right operand, storing the result in the specified destination. Similar to the sub instruction, the subc instruction subtracts the left operand from the right operand, but the subc instruction uses the C bit as a carry in to the subtraction. The inc and dec instructions increment and decrement the operand, respectively. The status register bits are updated for each of the above instructions as follows: the C bit is set if a carry occurs from the operation; the N bit is set to the most significant bit of the result; and the Z bit is set if the result is zero.

The and, or, and xor instructions perform their respective logical operations on the left and right operands. The C bit of the status register is cleared, while the N bit is set to the most significant bit of the result and the Z bit is set if the result is zero. The shift left and shift right instructions shift the operand one bit left or right (respectively). The C bit is shifted into the vacated bit of the operand, and the bit shifted out becomes the new C bit. The Z and N bits are set as described above. The move instruction transfers the left operand to the specified destination. The Z and N bits of the status register are set according to the value moved, and the C bit is cleared. The clear instruction clears the destination (i.e. all bits of the destination are set to zero). The C and N bits of the status register are cleared, and the Z bit is set.

Table 2 shows the encoding of address options field 106 for the instructions listed in Table 1, with the exception of the instructions which refer to Table 3. Table 2 lists the encodings of the sources subfield first, and then the encodings of the destination subfield. The sources subfield encodes a pair of sources for instructions which have two operands, and encodes a single source for instructions which have one operand. Each encoding is listed in Table 2. Table 3 shows the address options field 106 for instructions which refer to Table 3.

TABLE 2

Address Options Field 108 Encoding

| Source Subfield | Sources (2 operand, one operand) |
|---|---|
| 00 | ACC & AR, ACC |
| 01 | ACC & DATA, DATA |
| 10 | IMM & AR, IMM |
| 11 | IMM & DATA, AR |

| Destination Subfield | Destination |
|---|---|
| 000 | *AR |
| 001 | AR |
| 010 | AR (*AR to DATA) |
| 011 | ACC (*AR to DATA) |
| 100 | RAM |
| 101 | ACC |
| 110 | AR (Direct to DATA) |
| 111 | ACC (Direct to DATA) |

ACC indicates accumulator register 88. AR indicates address register 92. RAM indicates data memory 90 via direct addressing. *AR indicates data memory 90 via indirect addressing. IMM indicates immediate addressing. DATA indicates data register 94. Encodings 010, 011, 110, and 111 copy either indirectly or directly addressed data to data register 94 in parallel with executing the instruction. If the destination subfield encodings 100, 110, or 111 are used, then the source(s) may not be immediate data.

TABLE 3

Encodings for exceptions to Table 2

| Opcode | Address Opt. | Instruction |
|---|---|---|
| 01110 | 00101 | I/O write from accumulator 88 |
| 01110 | 10101 | I/O read to accumulator 88 |
| 01110 | 00011 | I/O write from data reg. 94 |
| 01110 | 10011 | I/O read to data memory 90 |
| 01111 | 00xxx | return from interrupt |
| 01111 | 01xxx | reset |
| 01111 | 10uuu | nop |
| 01111 | 11xxx | trap |

"x" indicates "don't care" values, which may be set or cleared. "uuu" indicates bits which are interpreted similar to the destination subfield above with respect to the contents of data register 94.

The I/O read instruction transfers data from registers or electronic devices coupled to input/output buses 96 and 98 to accumulator register 88 or data memory 90 (at the address pointed to by AR register 92). The address identifying the data to be transferred is stored in the address/data field of the I/O read instruction. The Z and N bits of the status register are updated according to the value read, and the C bit is cleared. The I/O write instruction transfers the value stored in accumulator register 88 or data register 94 to an electronic device or register coupled to input/output buses 96 and 98, as specified by the address/data field of the I/O write instruction. The status register is unaffected by the I/O write instruction.

The trap instruction causes an interrupt to occur, and may be used for debugging purposes. The return from interrupt instruction pops a program count value and the status register value from the stack, and causes the values to be stored into the respective registers of program control unit 80. Neither the trap nor the return from interrupt instructions modify the status register. The reset instruction clears the registers of DSP 10a, including the status register bits. The Nop instruction does not operate on operand, and modifies no destination. The status register is unaffected.

Instruction opcodes which use second instruction encoding 102 are listed in Table 4. Condition field 112 encodings are shown in Table 5. The conditions are listed first for the jump instruction, then for the jset instruction and jclr instruction. The conditional jump, jset, and jclr instructions ("jump instructions") may cause the next executable instruction to be an instruction stored at a different address in instruction memory 82 then the address indicated by the PC register. If the condition that the jump instruction tests for is not indicated by the bits within the status register or accumulator register 88, then the next instruction executed is the instruction subsequent to the jump instruction. For the jset and jclr instructions, the bit number listed in Table 4 below is the bit of accumulator register 88 which is tested. The jset instruction causes a jump if the bit is set, and the jclr instruction causes a jump if the bit is clear.

TABLE 4

Opcode Field 110 Encodings

| Opcode | Instruction |
|---|---|
| 1000 | jump |
| 1010 | jset |
| 1100 | jclr |

TABLE 5

Condition Field 112 Encodings

| Encoding | Condition (Jump, jset/jclr) |
|---|---|
| 000 | always, bit 0 |
| 001 | Z set, bit 1 |
| 010 | N set, bit 2 |
| 011 | C set, bit 3 |
| 100 | not used, bit 4 |
| 101 | Z clear, bit 5 |
| 110 | N clear, bit 6 |
| 111 | C clear, bit 7 |

Figure 5:
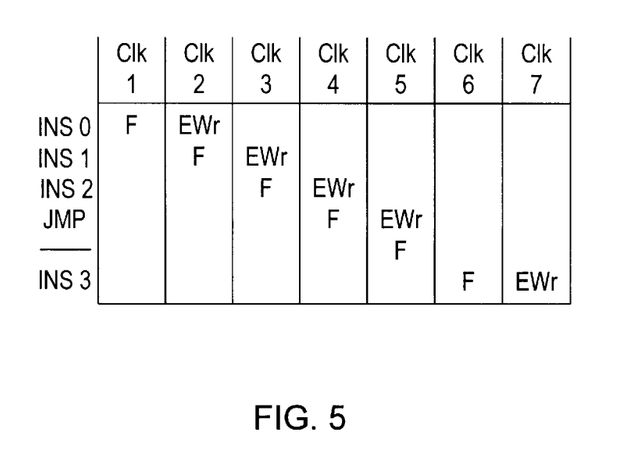
FIG. 5 is a timing diagram showing exemplary instructions flowing through a pipeline of the DSP shown in FIG. 3.

Turning now to FIG. 5, a timing diagram showing exemplary instructions flowing through the pipeline of DSP 10 (as shown in FIG. 3) is shown. It is noted that since the fetching of a subsequent instruction occurs during the same clock cycle as the execution and writing of the destination of a current instruction, DSP 10a implements an instruction processing pipeline.

As used herein, pipelining refers to overlapping the processing of a first instruction with the processing of a second instruction subsequent to the first instruction in a particular program. Pipelining is implemented by dividing the processing of an instruction into several subtasks. Each subtask may be performed in a separate pipeline stage which produces an intermediate result. The intermediate result is then passed to the next pipeline stage. For example, an instruction may add a pair of values together. Such an instruction must be fetched from instruction memory 82, the pair of values must be read from their respective storage locations, the addition must be performed, and then the result of the addition must be stored to a destination. These actions may be grouped into various subtasks. In this embodiment, the first subtask is fetching the instruction from instruction memory 24. The second subtask is reading the operands from their various storage locations (data memory 90, AR register 92, data register 94, or immediate data from the instruction), executing the instruction and writing the result to a destination. Each subtask is performed in a separate stage of the instruction processing pipeline.

By employing pipelining, the performance of DSP 10a is enhanced relative to a non-pipelined DSP. Instead of fetching a first instruction, executing the first instruction, and then fetching a second instruction, the second instruction is fetched concurrently with executing the first instruction. DSP 10a therefore has up to twice the instruction throughput of a non-pipelined implementation of DSP 10. Additionally, the clock cycle may be shorter than another possible implementation of DSP 10a in which the fetching and execution of an instruction are performed in a single clock cycle.

Pipelining can, however, introduce performance hazards. For example, if the instruction processing pipeline of DSP 10 were three stages instead of the two stages noted above, then jump instructions would introduce two empty slots in the instruction processing pipeline (as discussed below) instead of only one. Performance is decreased proportional to the number of empty slots (or "bubbles") created in the instruction processing pipeline, since no instructions are executed when the empty slots reach the execute-write stage of the instruction processing pipeline.

Additionally, if a third stage were added to the instruction processing pipeline of DSP 10a, then a complicated technique known in the art as data forwarding would need to be applied to DSP 10a to ensure that data required by a subsequent instruction is available if that data is generated by the current instruction. As will be appreciated by those skilled in the art, a three stage pipeline in DSP 10a would enable a second instruction to read operands during a clock cycle in which a first instruction is executing. If the result of executing the first instruction is written in a subsequent clock cycle to the destination, then the second instruction may read a previous value from the destination. The second instruction would therefore not receive the value that the first instruction created, and the program would execute incorrectly. Data forwarding is the process of forwarding the result of the first instruction to the second instruction. To implement data forwarding, the instruction processing pipeline must determine that the second instruction requires the result of the first instruction. Such a determination is difficult and time consuming, particularly if the destination of the first instruction is a storage location in memory. Therefore, an optimal pipeline is one which enables a short clock cycle but does not unduly complicate the design of DSP 10 and does not adversely affect instruction throughput.

Referring to FIG. 5, several clock cycles are depicted, which are labeled CLK 1 through CLK 7. An "F" indicates that the associated instruction resides in the fetch stage of the instruction processing pipeline. An "EWr" indicates that the associated instruction resides in the execute-write stage during that clock cycle. A clock cycle having no entry for an instruction indicates that the instruction is not within the instruction processing pipeline during that clock cycle.

During CLK 1, an instruction INS0 is fetched from instruction memory 82. During CLK 2, INS0 is executed and its result written to the specified destination. Additionally, an instruction INS1 is fetched during CLK2. An instruction INS2 is fetched during CLK 3 while INS1 is executed and the corresponding result is written to a destination. During CLK 4, INS2 is executed and the result is written to a destination, while a JMP instruction is fetched. JMP is executed during CLK 5, while an instruction subsequent to JMP is fetched. As can be seen by examining CLK 1 through CLK 5, DSP 10a is advantageously capable of executing one instruction per clock cycle. DSP 10a is capable of this instruction throughput notwithstanding the fact that each instruction utilizes two clock cycles within the instruction processing pipeline.

At the end of CLK 5, the program count register within program control unit 80 is updated with the target address of the JMP instruction. The instruction subsequent to the JMP instruction (fetched during CLK 5) is discarded and the instruction residing at the target of the JMP instruction is fetched during CLK 6. The instruction residing at the target of the JMP instruction is shown as INS3 in FIG. 5, and is executed during CLK 7. Additionally, the result of executing INS3 is written to the specified destination during CLK 7. As can be seen in CLK 6, an instruction does not complete due to the jump instruction executed during CLK 5. By maintaining a two stage instruction processing pipeline for DSP 10, the number of empty slots created in the instruction processing pipeline when jump instructions cause the fetch address to change is advantageously held to one. Therefore, a relatively optimal pipeline is implemented by DSP 10a.

Figure 6:
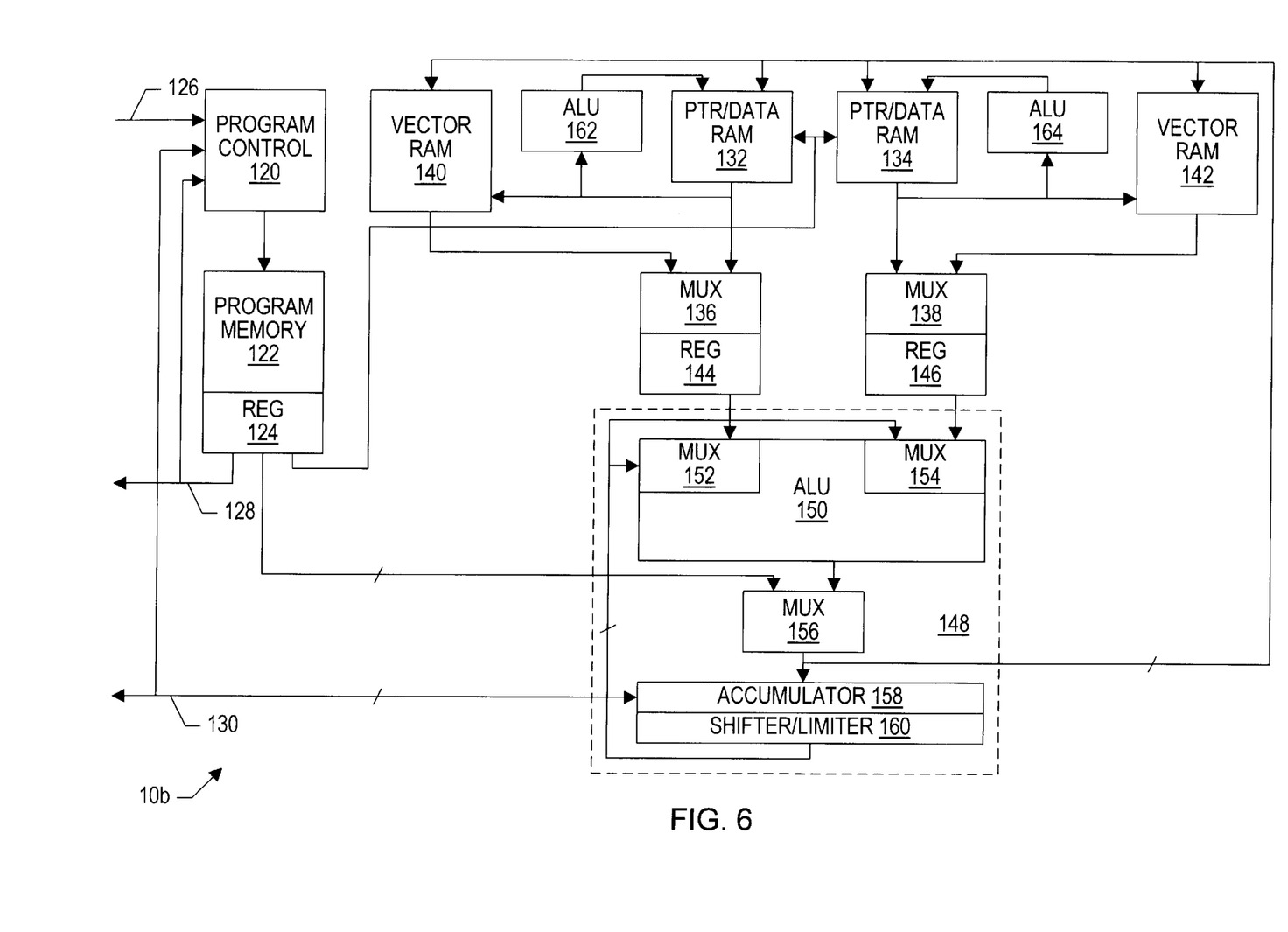
FIG. 6 is a block diagram of another exemplary embodiment of a DSP according to the present invention.

Turning next to FIG. 6, a block diagram of a second embodiment of DSP 10b is shown. For simplicity, only portions of DSP 10b pertaining to the present invention are shown. DSP 10b is configured with a program control unit 120 which is coupled to an instruction memory 122. Program control unit 120 is configured to fetch instructions from instruction memory 122 into a fetch register 124. In this embodiment, each instruction is fixed length. Additionally, program control unit 120 is configured to receive up to 16 interrupt signals on an interrupt bus 126 from electronic devices coupled to an input/output bus. The input/output bus is represented by address bus 128 and data bus 130 in FIG. 6. Exemplary electronic devices which may be coupled to address bus 128 and data bus 130 include analog to digital converter 16 and digital to analog converter 18 (shown in FIG. 1) and/or digital signal transmitter 22 and digital signal receiver 20 (shown in FIG. 2).

Fetch register 124 is coupled to a pair of pointer RAMs: left pointer RAM 132 and right pointer RAM 134. During a clock cycle subsequent to the fetching of an instruction, a pointer value may be read from left pointer RAM 132 and/or right pointer RAM 134 for use by the instruction. A pointer is read if the instruction is encoded for indirect addressing. As will be appreciated by those skilled in the art, a pointer is a value which is used as an address of an operand. The storage location addressed by the pointer is storing the operand that the associated instruction is intended to operate on. The values read from left pointer RAM 132 and right pointer RAM 134 are passed in the subsequent clock cycle as an address to a pair of vector RAMs: left vector RAM 140 and right vector RAM 142. Data read from left vector RAM 140 and right vector RAM 142 is then passed to multiplexors 136 and 138, respectively. In one embodiment, left pointer RAM 132 and right pointer RAM 134 are configured to store 24 bit values in each storage location. The value is used as a pointer, and is interpreted as follows: the most significant eight bits are referred to as a modulo field, the next most significant seven bits are an update value, and the least significant nine bits are an address for the respective vector RAM. The update value is used for the incrementing and decrementing of the pointer value, as explained below. The incrementing and decrementing of the pointer value are performed modulo the value stored in the modulo field. In other words, if the least significant bits of the pointer value are incremented or decremented and the resulting value would be larger than the value stored in the modulo field, then the value of the modulo field is effectively subtracted from the resulting value before storing the result in the least significant bits. Other bits of the pointer value are left unmodified. Additionally, hardware is included in DSP 10b which detects the most significant binary one bit of the modulo field. A respective number of the least significant bits of the address field are zeroed by the hardware when the address field is initialized (by an instruction writing the address field).

Multiplexor 136 is configured to select between the values read from left pointer RAM 132 and left vector RAM 140, allowing access to the pointer values for manipulation by certain instructions. Multiplexor 138 is configured similarly. The values selected by multiplexors 136 and 138 are stored into a pair of registers 144 and 146. The values stored in registers 144 and 146 are the operands to be used in the execution of the instruction during a subsequent clock cycle.

Instructions are executed by an execution unit 148. Execution unit 148 comprises an ALU 150, a pair of input multiplexors 152 and 154, an output multiplexor 156, an accumulator 158, and a shifter/limiter 160. Accumulator 158 is twice as wide as the input operands to ALU 150 in order to accommodate multiplication of input operands without overflow. In one embodiment, input operands are 16 bits and therefore accumulator 158 is 32 bits. Accumulator 158 is divided into a high half including the high order 16 bits of accumulator 158 and a low half including the low order 16 bits of accumulator 158. The high half or the low half of accumulator 158 may be used as an operand or destination of instructions, as will be explained in further detail below. Input multiplexors 152 and 154 are configured to select the left and right operands of ALU 150 from registers 144 and 146 or from accumulator 158. Therefore, a left operand may be a value from left pointer RAM 132, left vector RAM 140, or accumulator 158. Similarly, a right operand may be a value from right pointer RAM 134, right vector RAM 142, or accumulator 158. When accumulator 158 is used as a left operand, the high half of the value stored in accumulator 158 is used. When accumulator 158 is used as a right operand, the low half of accumulator 158 is used. ALU 150 performs the operation specified by the instructions upon the left and right operands and conveys the result to output multiplexor 156.

Output multiplexor 156 selects between the result and data conveyed from instruction register 124. The load instruction may retrieve data from the storage location in instruction memory 122 subsequent to the load instruction, and multiplexor 156 provides the path for this data to enter the pipeline of DSP 10b. The result of the instruction is routed through output multiplexor 156 to a destination, which may be accumulator 158, right vector RAM 142, right pointer RAM 134, left pointer RAM 132, or left pointer RAM 140. Shifter/limiter 160 is used by the shift and shift and saturate instructions to modify the value stored in accumulator 158.

If the destination of an instruction is right vector RAM 142, right pointer RAM 134, left pointer RAM 132, or left vector RAM 140, then the destination address is specified in a subsequent instruction. The encoding of the destination of an instruction within a subsequent instruction will be explained in more detail below with respect to FIG. 7. As with the embodiment shown in FIG. 3, this embodiment of DSP 10 performs the execution of the instruction and the writing of the destination within the same clock cycle in an execute-write stage of the instruction processing pipeline.

In addition to modifying a destination, instructions within this embodiment of DSP 10b may update pointers which are stored within left pointer RAM 132 and right pointer RAM 134. The pointers may be used by the instruction to indicate an operand stored within vector RAMs 140 or 142, or the pointer values may be specified by an instruction which does not use the left or right operand. If a pointer value is used to indicate an operand and is specified for update, the value of the pointer prior to performing the update is used to locate the operand. A left ALU 162 and a right ALU 164 are included within DSP 10b for performing the pointer updates. Left ALU 162 receives the current pointer from left pointer RAM 132 and performs the indicated modification, storing the result into left RAM 132. Similarly, right ALU 164 receives the current pointer from right pointer RAM 134 and performs the indicated modification, storing the result into right RAM 134. The modifications which may be performed on a pointer value include incrementing or decrementing by either one or by the update value stored with the pointer. One instruction may therefore modify up to three storage locations: a left pointer, a right pointer, and a destination.

Program control unit 120 is configured with several registers. A program count register is included for storing the instruction fetch address for each clock cycle. The program count register is typically incremented to the next address each clock cycle. Additionally, the program count register may be changed to a different address (the "target" address) by a jump instruction or to an interrupt vector address by receiving an interrupt on interrupt bus 126. An interrupt enable register similar to the interrupt enable register described above is included, as well as a status register. In this embodiment, the status register stores the carry, negative, and zero bits described above. In addition, the status register stores an overflow flag indicative of an arithmetic overflow of the result of an instruction. An arithmetic overflow occurs when the value computed by ALU 150 may not be represented in the number of bits that the destination is capable of storing. A limit flag is also included which is used with the shift and saturate instructions, as will be described below. Four guard bits are included for use with some instructions. The guard bits provide temporary overflow storage for accumulator 158. Oftentimes, the algorithm being executed by DSP 10b can be characterized by a result which may be represented in 32 bits, but intermediate values calculated in preparation for computing the result may not be representable in 32 bits. Instead, as many as 36 bits may be required. The overflow storage allows the intermediate values to be calculated without a loss of accuracy that would be incurred if the overflow bits were not stored. Other bits within the status register may be used for other purposes.

Shadow registers for the program counter, status register, and accumulator 158 are included within program control unit 120 for use with interrupts, similar to the function described above with respect to FIG. 3. Finally, a start, a count, and an end register are included within program control unit 120 for use with the loop instruction (described below).

Program control unit 120 implements an interrupt structure for handling interrupts. It is noted that any interrupt structure may be used. In one exemplary interrupt structure, each interrupt signal on interrupt bus 126 is associated with a unique interrupt enable bit within the interrupt enable register. If an interrupt signal is asserted and the associated interrupt enable bit is set, then an interrupt handler associated with that particular interrupt signal is invoked. When an interrupt occurs, the contents of the program counter register, status register, and accumulator 158 are swapped with their corresponding shadow registers and the address of the respective interrupt handler is loaded into the program counter. Interrupts are disabled for four clock cycles after an interrupt occurs, and certain instructions (as will be described below) disable interrupts for a certain number of clock cycles as well. Otherwise, interrupts are enabled as long as the associated bit within the interrupt enable register is set.

Figure 7:
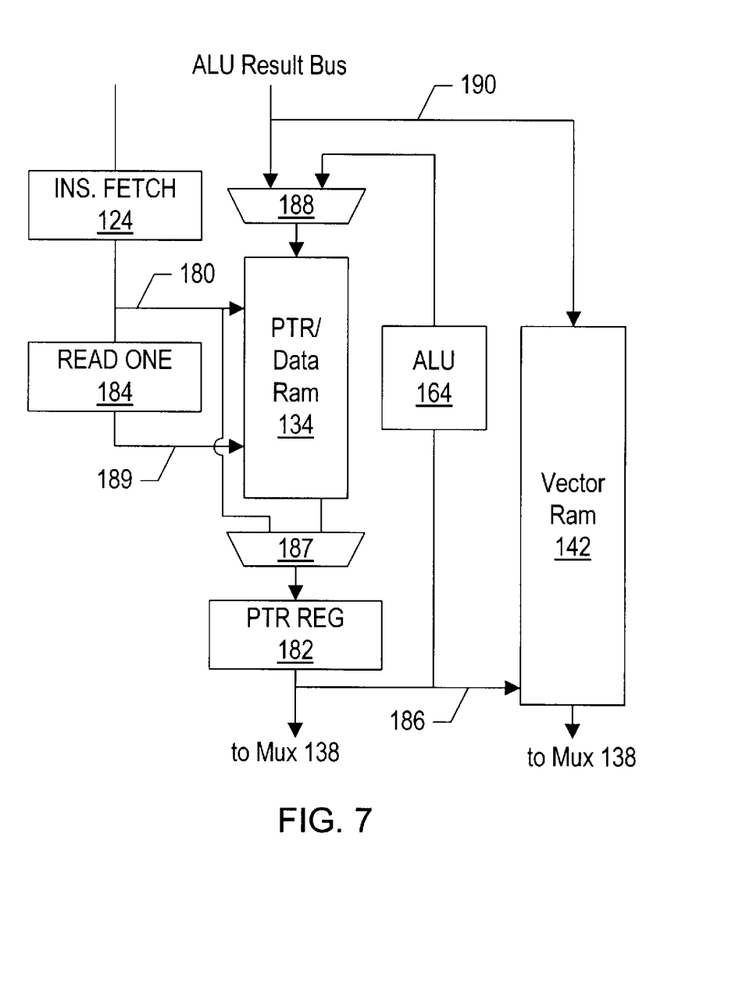
FIG. 7 is a diagram of the read/write structure for the RAM elements of the DSP shown in FIG. 6.

Turning next to FIG. 7, a portion of the instruction processing pipeline of DSP 10b is shown. FIG. 7 further illustrates the hardware used to specify the destination of an instruction within a subsequent instruction. Fetch register 124, right pointer RAM 134, right ALU 164, and right vector RAM 142 (all shown in FIG. 6) are shown. A similar configuration to that shown in FIG. 7 is included within DSP 10b for left pointer RAM 132, left ALU 162, and left vector RAM 140.

During a first clock cycle, a first instruction is fetched into instruction fetch register 124. During a second clock cycle, a second instruction is fetched into fetch register 124 while the first instruction accesses (or "reads") a storage location from right pointer RAM 134 via a read port 180. The value stored in the storage location indicated by the first instruction is conveyed to a multiplexor 187, which is additionally coupled to receive the value which accesses read port 180. Multiplexor 187 allows direct vector addressing, in which a value included with the instruction directly addresses vector RAM 142. Multiplexor 187 selects the value conveyed to read port 180 if direct vector addressing is selected for an instruction, otherwise multiplexor 187 selects the output of right pointer RAM 134. The value selected by multiplexor 187 is stored into a pointer register 182 at the end of the second clock cycle. Additionally, a portion of the first instruction indicative of the accessed storage location within right pointer RAM 134 is stored within a read one register 184 at the end of the second clock cycle.

During a third clock cycle, the value in pointer register 182 is conveyed to a read/write address port 186 on right vector RAM 142. The value in the indicated storage location of right vector RAM 142 is conveyed to multiplexor 138 (shown in FIG. 6). Additionally, the value stored in pointer register 182 is conveyed to multiplexor 138. The value stored in pointer register 182 is conveyed to right ALU 164, which performs any pointer modification indicated by the first instruction upon the pointer value. If a modification is indicated, then the result of the modification is routed through a multiplexor 188 to a write data port on right pointer RAM 134. The address for the update is stored within read one register 184, which is coupled to a write address port on right pointer RAM 134. The write address port specifies the storage location of a RAM to store the data into, and the write data port specifies the data to store into the specified storage location. During the third cycle, the second instruction reads a pointer from right pointer RAM 134 via read port 180, and the associated pointer is stored into pointer register 182. The portion of the second instruction indicative of the accessed storage location within right pointer RAM 134 is stored within read one register 184 at the end of the third clock cycle.

During a fourth clock cycle, the first instruction is executed by execution unit 148 (shown in FIG. 6). The result of executing the first instruction is conveyed on ALU result bus 190 from execution unit 148. If the destination of the result is right pointer RAM 134 (as indicated by the first instruction encoding), then multiplexor 188 routes the result to the write data port of right pointer RAM 134. The storage location which is written into is specified by the address on a write address port 189. As noted above, read one register 184 (which is connected to write address port 189) is storing a portion of the second instruction, and therefore the destination of the first instruction is specified by second instruction.

The destination of the first instruction may also be within right vector RAM 142. Therefore, the write data port of right vector RAM 142 is coupled to ALU result bus 190. The result is written into right vector RAM 142 at the address specified on read/write address port 186 if the destination of the first instruction is right vector RAM 142. The address on read/write address port 186 is the value stored in pointer register 182 during the fourth clock cycle, which is a value specified by the second instruction (as noted above). Again, the destination of the first instruction is specified by the second instruction.

By encoding the destination of an instruction within a subsequent instruction when the destination is a RAM, the instruction set of DSP 10 does not require extra bits for the encoding of the destination address within each instruction. Instead, bits of the subsequent instruction are used to specify the destination. The bits used to specify the destination are bits that would normally be used to specify an operand address. Special considerations therefore apply when encoding instructions for DSP 10 (as will be explained below). However, the instruction set of DSP 10 is encoded in a smaller number of bits than would otherwise be possible. Since the instruction length is shorter, the amount of instruction memory needed to store a particular program is advantageously decreased. Therefore, more instructions may be stored in an instruction memory of a particular size than would otherwise be possible. Instruction memory may be made smaller, conserving die area. However, the smaller instruction memory retains the capability of storing a similar number of instruction as a larger memory employed within a DSP using conventional instruction encodings.

It is understood that similar hardware may be employed to allow storage of a source operand for an instruction within a prior instruction. Such hardware would support an instruction which encodes the destination and one source operand within a current instruction, and the destination may be used as a second source operand for a subsequent instruction. Generally speaking, similar hardware may be employed to store the operand of a particular instruction within another instruction subsequent to or prior to the particular instruction. Such embodiments are contemplated.

Figure 8:
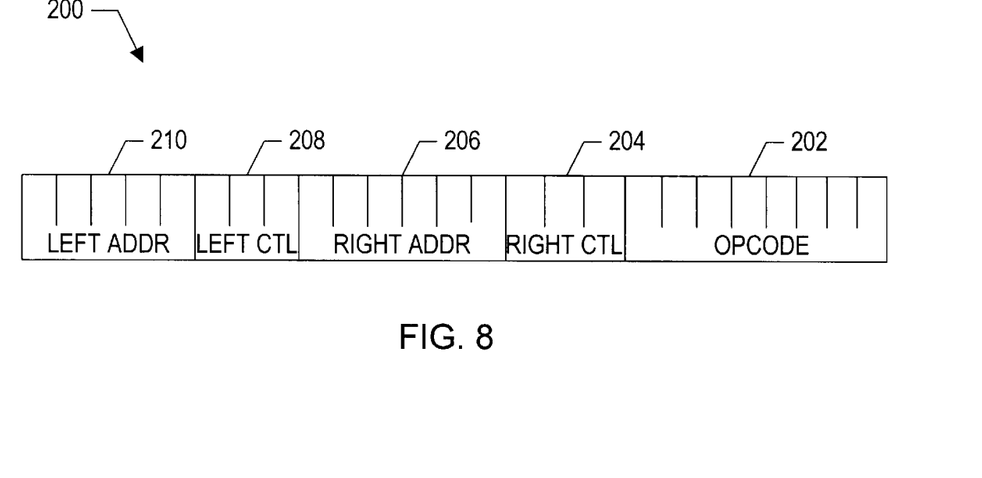
FIG. 8 is a diagram of an instruction format for the DSP shown in FIG. 6.

Turning next to FIG. 8, an encoding 200 of the instruction set of DSP 10b is shown. The instruction set is encoded into 25 bits in this embodiment, and five fields are included. Opcode field 202 is included for specifying the instruction to be executed, and comprises eight bits in this embodiment. A right control field 204 is included for encoding control information relative to the right operand of the instruction, and is three bits in this embodiment. A right address field 206

(comprising six bits in this embodiment) specifies the address for right pointer RAM 134. Similar to right control field 204 is a left control field 208, specifying control information relative to the left operand of the instruction. Finally, a left address field 210 is included. Left address field 210 specifies the address for left pointer RAM 132 and is five bits wide in this embodiment. For instructions which do not require two operands, either left address field 210 and left control field 208 or right address field 206 and right control field 204 may be used to further define the instruction. For each instruction which changes the meaning of these fields, the respective instruction description below will explain the meanings of these fields.

Table 6 shows an exemplary encoding of opcode field 202 for the exemplary instruction set of DSP 10.

TABLE 6

Encoding for Opcode Field 202

| Opcode | Instruction |
|---|---|
| xxvv0000 | subtract left from right |
| xxvv0001 | subtract left from right with carry |
| xxvv0010 | subtract right from left |
| xxvv0011 | subtract right from left with carry |
| xxvv0100 | add |
| xxvv0101 | add with carry |
| xxvv0110 | AND |
| xxvv0111 | OR |
| xxvv1000 | XOR |
| xxvv1001 | multiply |
| xxvv1010 | multiply and add accumulator |
| xxvv1011 | multiply and subtract from accumulator |
| xxvv1100 | move |
| y0001101 | bit set |
| y0011101 | bit clear |
| y0101101 | shift/shift round |
| y0111101 | shift and saturate/shift-round-saturate |
| y1001101 | I/O read |
| y1011101 | I/O write |
| y1101101 | move modulo to acch |
| y1111101 | move acch to modulo |
| 00zz1110 | compare |
| 01zz1110 | reserved |
| 1wwww1110 | load |
| 00001111 | return |
| 00011111 | return from interrupt |
| 00101111 | nop |
| 00111111 | reset |
| 01001111 | loop |
| 01101111 | interrupt |
| 10001111 | conditional jump/subroutine |
| 10011111 | absolute value accumulator |
| 10101111 | jump on bit set |
| 10111111 | jump on bit clear |
| 11001111 | clear accumulator |
| 11011111 | negate accumulator |
| 11101111 | jump on bit set to subroutine |
| 11111111 | jump on bit clear to subroutine | xxvv=operand (xx) and destination (vv) information, see Table 6; y=a bit indicative of which control/address fields are used to further define instruction (see instruction descriptions); zz=left and right operand specifier, see instruction description; www=destination specifier, see instruction description. Encodings marked reserved are not used.

TABLE 6

Operand/Destination Encodings

| xx value | left operand | right operand |
|---|---|---|
| 00 | acch | accl |
| 01 | acch | right RAM |
| 10 | left RAM | accl |
| 11 | left RAM | right RAM | acch=high half of accumulator 158; accl=low half of accumulator 158. When left or right RAM is selected as an operand, the addressing (direct or indirect) is controlled by the left or right control fields, as indicated in Table 7. If direct vector addressing is specified, then the operand is stored within left or right pointer RAM. If indirect addressing is specified, then the operand is stored within left or right vector RAM.

| vv value | destination |
|---|---|
| 00 | acch (or acc for the multiply ins.) |
| 01 | accl |
| 10 | left RAM |
| 11 | right RAM | acch=high half of accumulator 158; accl=low half of accumulator 158. If left or right RAM is the destination, the destination address is supplied in a subsequent instruction. The addressing (direct or indirect) is also supplied in the subsequent instruction, as indicated in Table 7. If direct vector addressing is specified, then the destination is a storage location within left or right pointer RAM. If indirect addressing is specified, then the destination is a storage location within left or right vector RAM. Direct address field allows for addressing modes not supported by DSP 10b to be performed under control of the program being executed by DSP 10b. The address field of pointer RAM is used as a destination for this addressing mode. Direct update field allows the update field of pointer RAM to be changed directly by an instruction. The update field is used as a destination for this addressing mode. As with direct or indirect addressing, the address of the address field or update field to be modified is specified within the subsequent instruction.

TABLE 7

Encoding for Right Control
Field 204 and Left Control Field 208

| Encoding | Meaning |
|---|---|
| 000 | direct vector addressing |
| 001 | indirect addressing |
| 010 | indirect, pointer incr. by update value |
| 011 | indirect, pointer decr. by update value |
| 100 | indirect, pointer increment by one |
| 101 | indirect, pointer decrement by one |
| 110 | direct address field |
| 111 | direct update field |

The instructions listed in Table 6 will now be defined. The instructions are defined in alphabetical order, not in the order of their listing in Table 6. Generally speaking, if an instruction uses left RAM as a destination than a particular subsequent instruction may not use left RAM as an operand (unless the destination storage location of the previous instruction is used as the operand). Similarly, if an instruction uses right RAM as a destination then a particular subsequent instruction may not use right RAM as an operand (unless the destination storage location of the previous instruction is used as the operand). Also, as mentioned above, if a destination is left or right RAM then the corresponding address and control fields of the subsequent instruction specify the destination and addressing. If the left or right address and control fields are used for other purposes, as specified in the individual instruction descriptions, then this use supersedes the definition of these fields given above. Finally, if a left or right operand is not from a RAM or is not used by an instruction, then the corresponding address and control fields may be used to perform an arbitrary pointer update within the corresponding pointer RAM.

The absolute value accumulator instruction produces the mathematical absolute value of the value formed by concatenating the guard bits with the value stored in accumulator 158 and stores the result in accumulator 158. The left and right address and control fields may be used to perform pointer value updates. The status register is affected as follows: The carry and negative bits are cleared; the zero bit is set if the accumulator contains zero; the overflow bit is unchanged; the guard bits are updated with the four most significant bits of the result; and the limit bit is unchanged.

The add instruction performs a two's complement addition of the left and right sources and stores the result into the destination. If the high half of the accumulator is specified as an operand, the operand value is the guard bits from the status register concatenated with the value stored in the high half of the accumulator. The status register is updated as follows: The carry bit is set according to the carry from the addition; the negative bit is set to the most significant bit of the result; the zero bit is set if the result is zero; the overflow bit is set if the addition overflows; the limit bit is unchanged; and the guard bits are updated with the most significant four bits of the result if the destination is the high half of the accumulator, otherwise the guard bits are unchanged. Add with carry operates the same as the add instruction, but includes the carry bit in the addition along with the left and right operands.

The AND instruction performs the logical AND of its left and right operands and stores the result in the destination. The status register is updated as follows: the carry bit, overflow bit, guard bits, and limit bit are unchanged; the negative bit is set to the most significant bit of the result; and the zero bit is set if the result is zero.

The bit clear instruction clears a specified bit in the destination. The "y" bit of the instruction opcode specifies whether the left or right address and control fields are used to specify which bit to clear and to specify the destination. If the "y" bit is a zero, the left fields are used, and if the "y" bit is a one, the right fields are used. If the "y" bit is a zero, the destination is in right RAM or the accumulator. If the "y" bit is a one, the destination is in left RAM or the accumulator. The bit to clear is encoded as a number between zero and fifteen. The destination is encoded as two bits wherein: "00" indicates the high half of the accumulator; "01" indicates the low half of the accumulator; "10" indicates left RAM; and "11" indicates right RAM. The status register is updated as follows: the carry, overflow, guard, and limit bits are unchanged; the negative bit is set to the most significant bit of the result; and the zero bit is set if the result is zero. The bit set instruction is the same as the bit clear instruction, except that the specified bit in the destination is set instead of cleared.

The clear accumulator instruction clears the bits in the accumulator. Also cleared are the status register carry, negative, overflow, and guard bits. The zero bit of the status register is set to high. The limit bit of the status register is unchanged.

The compare instruction subtracts the left operand from the right operand and discards the result. The status register is updated as follows: the carry bit is the carry of the subtraction; the negative bit is the most significant bit of the result; the zero bit is set if the result is zero; the overflow bit is set if the subtraction overflows; and the guard bits and limit bit are unchanged. The "zz" field specifies the left and right operands. If one bit of the "zz" field is zero, then the high half of the accumulator is the operand. If that bit is one, then left RAM contains the operand. If the other bit of the "zz" field is zero, then the low half of the accumulator is the right operand. If that bit is a one, then right RAM is the operand.

The interrupt instruction causes program controller 120 to interrupt, as explained above. The interrupt handler for the interrupt instruction is stored at address 3f8 (in hexadecimal).

The I/O read instruction reads one of the registers in program control unit 120 or an electronic device coupled to address bus 128 and data bus 130. The "y" bit of the instruction opcode specifies whether the left or right address and control fields are used to specify which register to read and to specify the destination. If the "y" bit is a zero, the left fields are used, and if the "y" bit is a one, the right fields are used. If the "y" bit is a zero, the destination is in right RAM or the accumulator. If the "y" bit is a one, the destination is in left RAM or the accumulator. The register to be read is encoded as a number between zero and 63. The destination is encoded as two bits where: "00" indicates the high half of the accumulator; "01" indicates the low half of the accumulator; "10" indicates left RAM; and "11" indicates right RAM. If the high half of the accumulator is the destination, the low half of the accumulator is cleared. The status register is updated as follows: the carry bit is unchanged; the negative bit is set to the most significant bit of the result; the zero bit is set if the result is zero; the overflow bit and limit bit are unchanged; and the guard bits are set to the most significant bit of the result if the destination is the high half of the accumulator, otherwise the guard bits are unchanged. The I/O write instruction is similar to the I/O read instruction, except that the destination is an I/O register or an electronic device specified by the left or right address and control fields and the source is the accumulator, left RAM, or right RAM. The status register is unaffected by the I/O write instruction.

The jump on bit clear instruction causes the program counter value to be changed to an address specified within the left and right address and control fields if a particular bit of the accumulator is clear. The bit is encoded into the left and right address and control fields as a number between zero and 31. The remaining bits in the left and right address and control fields are used to specify the address for the program counter. The status register is not updated for this instruction. Jump on bit set is similar to jump on bit clear except the jump is performed if the specified bit is set. If the jump is not performed (because the specified bit is set or clear, respectively), then the instruction subsequent to the jump instruction is executed.

Similar to the jump on bit set instruction, the conditional jump instruction causes the program counter value to be changed to an address specified by the left and right address fields of the instruction if a specified status register bit is set or clear. The status register is not updated. The status register bit to be used as the condition for the instruction is encoded as four bits within the left and right address fields of the instruction as follows: "0000" indicates jump always (i.e. always cause the program counter value to change to the indicated address); "0001" indicates jump if the carry bit is set; "0010" indicates jump if the zero bit is set; "0011" indicates jump if the negative bit is set; "0101" indicates jump if the carry bit is clear; "0110" indicates jump if the zero bit is clear; "0111" indicates jump if the negative bit is clear; and "0100" and "1000" through "1111" are reserved. The conditional jump to subroutine instruction is similar to the conditional jump instruction except that the program counter value prior to changing to the specified address is copied into the shadow program count register within program control unit 120.

The load instruction is a two word instruction stored in two consecutive locations of instruction memory 122. A word is 25 bits in this embodiment, corresponding to one instruction. The load instruction is used to place data from the instruction into the specified destination. If the destination is a pointer RAM, then 24 bits of data are used. If the destination is a vector RAM or the accumulator, then 16 bits of data are used. The instruction opcode includes a "www" field, as shown in Table 6. One bit of the "www" field indicates which of the left and right address and control fields are used to specify eight bits of the data. In one embodiment, a zero in that bit indicates that the left address and control fields specify eight bits of data and a one in that bit indicates that the right address and control fields specify eight bits of data. The other two bits of the "www" field are used to specify the destination. In one embodiment, "00" indicates the high half of the accumulator, "01" indicates the low half of the accumulator, "10" indicates left RAM, and "11" indicates right RAM. For the load instruction, the destination is encoded in the second word of the instruction if the destination is left or right RAM. The remaining bits in the second word are used to specify the other 16 bits of data. If the high half of the accumulator is the destination of the load instruction, then the low half of the accumulator is cleared. The status register is updated as follows: the carry, overflow, and limit bits are unchanged; the negative bit is set to the most significant bit of the result; the zero bit is set if the result is zero; and the guard bits are set to the most significant bit of the result if the high half of the accumulator is the destination, otherwise the guard bits are unchanged.

The loop instruction is a two word instruction stored in two consecutive locations of instruction memory 122. The loop instruction is used to load the count register, start register, and the end register. When the program flow reaches the start address, the instructions between the start register address and the end register address are then executed the number of times stored in the count register plus one. The status register is unchanged by this instruction.

The move instruction moves data from one operand to the destination. The other operand is not used, and therefore may be used to perform an arbitrary pointer update. The move instruction therefore uses a different encoding for the "vv" bits of the opcode: "00" is indicative of the high half of the accumulator; "01" is indicative of the low half of the accumulator; "10" is indicative of left RAM, and "11" is indicative of right RAM. If the destination of the instruction is the high half of the accumulator, the low half of the accumulator is cleared. The status register is updated as follows: the carry, overflow, and limit bits are unchanged; the negative bit is set to the most significant bit of the result; the zero bit is set if the result is zero; and the guard bits are set to the most significant bit of the result if the destination is the high half of the accumulator, otherwise the guard bits are unchanged.

The move acch to modulo instruction moves the high half of the accumulator to the modulo field of a storage location in pointer RAM. The "y" bit of the instruction opcode specifies whether the left or right pointer RAM is the destination of the instruction. If the "y" bit is a zero, left RAM is the destination; and if the "y" bit is a one, right RAM is the destination. The status register is unaffected by this instruction.

Similar to the move acch to modulo instruction is the move modulo to acch instruction. However, the modulo field of the indicated left or right pointer RAM location is moved to the high half of the accumulator. The "y" bit of the instruction opcode specifies the operand of the instruction, similar to that defined above for the move acch to modulo instruction. The status register is unaffected by this instruction.

The multiply instruction multiplies the left and right operands, producing a 32 bit result in this embodiment. If the destination is the accumulator, then the entire 32 bit result is stored. Otherwise, the high order 16 bits of the result are stored in the destination. The status register is updated as follows: the carry, overflow, and limit bits are unchanged; the negative bit is set to the most significant bit of the result; the zero bit is set if the result is zero; and the guard bits are updated with the most significant bit of the result if the destination is the accumulator, otherwise the guard bits are unchanged.

The multiply and add accumulator instruction first performs the multiply of the operands as with the multiply instruction, then adds the guard bits concatenated with the contents of the accumulator to the multiplication result to produce the result of the instruction. If the destination is not the accumulator, bits 31 through 16 of the result (i.e. the high order 16 bits not including the guard bits) are stored in the destination. If the destination is the accumulator, then the bits are stored into the guard bits of the status register and the accumulator. The other bits of the status register are updates as follows: the carry and limit bits are unchanged; the negative bit is set to the high order bit of the result; the zero bit is set if the result is zero; and the overflow bit is set if the addition overflows 32 bits (or 36 bits if the destination is the accumulator).

Similar to the multiply and add accumulator instruction, the multiply and subtract from accumulator instruction multiplies the operands to produce a multiplication result. The multiplication result is then subtracted from the guard bits of the status register concatenated with the contents of the accumulator. If the destination is the accumulator, the result is stored in the guard bits concatenated with the accumulator. Otherwise, bits 31 through 16 of the result are stored into the destination and the guard bits are unaffected. The remainder of the status register is updated as follows: the carry and limit bits are unchanged; the negative bit is set to the high order bit of the result; the zero bit is set if the result is zero; and the overflow bit is set if the subtraction overflows 32 bits (or 36 bits if the destination is the accumulator).

The negate accumulator instruction changes the sign of the value stored in the accumulator. The status register is updated as follows: the carry bit is cleared; the negative bit is set to the most significant bit of the result; the zero bit is set if the result is zero; the guard bits are updated with the most significant bits of the result; and the overflow and limit bits are unchanged.

The nop instruction has no operands and updates no registers. The nop instruction may be used to specify the destination of a previous instruction if the instruction subsequent to the nop uses the address and control field needed to specify the destination of the previous instruction. The status register is not updated.

The OR instruction performs the logical OR of the operands and stores the result in the destination. The status register is updated as follows: The carry, overflow, guard, and limit bits are unchanged; the negative bit is set to the most significant bit of the result; and the zero bit is set if the result is zero.

The return from interrupt instruction copies the values stored in the shadow copies of the program count register, the status register, and the accumulator into the respective registers. The program count register is thereby changed to the address it contained before the interrupt occurred. Additionally, interrupts are disabled for four clock cycles after the return from interrupt instruction is fetched. Three instructions subsequent to the return from interrupt instruction are executed before the instruction stored at the address provided by the interrupt shadow program count register.

Similar to the return from interrupt, the return from subroutine instruction copies the shadow program count register value into the program count register. The interrupts are disabled for four clock cycles after the return from subroutine instruction is fetched. Three instructions subsequent to the return from subroutine instruction are executed prior to the instruction stored at the address provided by the subroutine shadow program count register. The status register is not updated.

The shift instruction shifts the value formed by concatenating the guard bits of the status register to the contents of the accumulator. The shift may be specified as left or right, and the number of bits to shift by may be between one and eight. The number of bits to shift, the destination, and whether the shift is left or right are stored in either the left address and control field or the right address and control field, as determined by the "y" bit of the opcode field. If the "y" bit is a zero, then the left address and control field is used. If the "y" bit is a one, then the right address and control field is used. The destination may be either the accumulator, left RAM, or right RAM. In one embodiment, the encoding of the destination is two bits wherein: "00" is indicative of the accumulator; "10" is indicative of left RAM; and "11" is indicative of right RAM. If the destination is the accumulator, the 36 bit shifted result (zeros are shifted into the vacated bits for a shift left or the most significant bit is copied into the vacated bits for a shift right) is stored into the guard bits concatenated with the accumulator. If the destination is left or right RAM, bits 31 through 16 of the shifted value are stored into the destination. The status register is updated as follows: the carry bit and limit bits are unchanged; the negative bit is set to the most significant bit of the result; the zero bit is set if the result is zero; and the overflow bit is set of the result overflows 16 bits (or 36 bits if the accumulator is the destination). For the shift round instruction, the data from acc is shifted and then rounded to the number of bits of the destination.

The shift and saturate instruction is similar to the shift instruction. However, if the shifted result cannot be represented in 32 bits, the result is set to the most positive or most negative number (depending on whether the original number is positive or negative, respectively). If the result is the most positive or most negative number, then the limit bit of the status register is set. Other bits of the status register are updated as described above for the shift instruction. For shift round and saturate instruction, the data from acc is shifted, rounded and then saturates the result.

The reset instruction clears the registers stored within program control unit 120 as well as the accumulator register.

The next instruction fetched is fetched from instruction memory location zero (since the program count register is cleared).

The subtract instructions (i.e. subtract left from right, subtract right from left, subtract left from right with carry, and subtract right from left with carry) are used to subtract one operand from the other. If the instructions specify "with carry", then the carry bit is used as a carry in to the subtraction. If the high half of the accumulator is the operand, then the guard bits concatenated with the high half of the accumulator are used as the operand. If the high half of the accumulator is the destination, then the result is stored into the guard bits concatenated with the high half of the accumulator. The remainder of the status register is updated as follows: the carry bit is set to the carry out of the subtraction; the limit bit is unchanged; the negative bit is set to the most significant bit of the result; the zero bit is set if the result is zero; and the overflow bit is set if the subtraction overflows.

The XOR instruction performs the logical XOR of the operands. The status register is updated as follows: the carry, overflow, guard, and limit bits are unchanged; the negative bit is set to the most significant bit of the result; and the zero bit is set if the result is zero.

Figure 9:
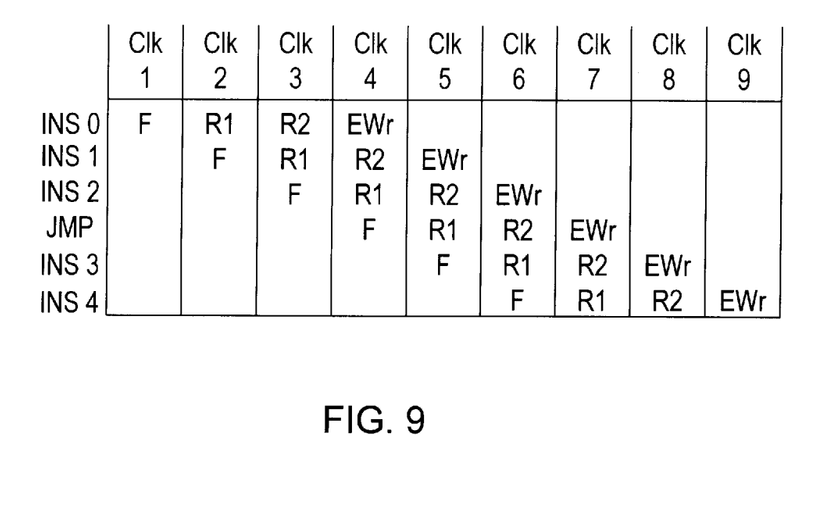
FIG. 9 is a timing diagram showing exemplary instructions flowing through a pipeline of the DSP shown in FIG. 6.

Turning now to FIG. 9, a timing diagram depicting exemplary instructions flowing through the embodiment of DSP 10 shown in FIG. 6 is shown. Nine consecutive clock cycles are shown, labeled CLK 1 to CLK 9. In this embodiment, jump instructions have a four stage instruction processing pipeline comprising a fetch stage, read stage, update stage, and an address generation stage. Return from interrupt and return from subroutine instructions similarly flow through the four stage instruction processing pipeline. During the fetch stage, the instruction is fetched from instruction memory 122 and stored in fetch register 124. During the address generation stage, an update address for the program count register is formed from either the current program counter plus one (if the jump instruction is not taken) or an address specified by the jump instruction, or the interrupt shadow program counter value for the return from interrupt, or the subroutine shadow program counter value for return from subroutine instruction. The new address is stored in the program counter at the end of the address generation stage.

All instructions within DSP 10's instruction set utilize a four stage instruction processing pipeline. The four stage instruction processing pipeline comprises a fetch stage, a first read stage, a second read stage, and an execute/write stage. The fetch stage is similar to the above described fetch stage. During the first read stage, the instruction accesses left and right pointer RAMs 132 and 134. The appropriate operands or pointers are read (if any). During the second read stage, the instruction accesses left and right vector RAMs 140 and 142. The appropriate operands are read (if any) and pointers are updated (if any). During the execute/write stage, the instruction is executed upon the operands and a result is generated. The result is stored in the destination during this same execute/write stage.

In FIG. 9, an instruction occupying the instruction fetch stage is represented by an "F" in the appropriate clock cycle. Similarly, an instruction in the first read stage is represented by an "R1", an instruction in the second read stage is represented by an "R2", and an instruction in the execute/write stage is represented by an "EWr". The jump instruction reaching the address generation stage is represented by an "AG" in the appropriate clock cycle. If no entry is listed for an instruction during a clock cycle, then the instruction is not within the instruction processing pipeline during the clock cycle.

An instruction INS0 is fetched during CLK 1, reads pointer operands during CLK 2, reads data operands during CLK 3, and executes and writes the result to the destination during CLK 4. This flow through the instruction processing pipeline is repeated for an instruction INS2 during CLK 2 through CLK 5, and for an instruction INS3 during CLK 3 through CLK 6. Advantageously, instructions complete one per clock cycle even though each instruction utilizes four clock cycles to be processed. A jump instruction JMP is fetched during CLK 4 and enters address generation during CLK 7, as represented by the associated "F" and "AG" on FIG. 9. During the address generation stage, JMP determines that the next value for the program counter is the address specified by the JMP instruction. Therefore, the instruction fetched during CLK 7 (which is the third instruction subsequent to the JMP instruction) cannot be a two word instruction, or specify left RAM or right RAM as destination.

For sake of clarity, the above description of embodiments of DSP 10 has included specific sizes of various elements. For example, instruction lengths, register widths, and memory storage have been specifically sized. However, these sizes are exemplary only. Any suitable size for the various elements of DSP 10 may be used and is specifically contemplated.

In accordance with the above disclosure, three embodiments of a digital signal processor (DSP) have been described. Each DSP is configured with an instruction processing pipeline including an execute/write pipeline stage. Such pipelined DSPs advantageously execute up to one instruction per clock cycle even though each instruction utilizes multiple clock cycles to execute. Additionally, the execute/write pipeline stage shortens the pipeline, limiting the deleterious effects that may be associated with long pipelines. For example, jump instructions may create fewer bubbles in the pipeline than if the pipeline were longer. Additionally, results are available for subsequent instructions to use earlier if the pipeline is shorter. The third embodiment shown also employs a reduced instruction size by encoding the destination address (for destinations in memory) of an instruction within a subsequent instruction. If conventional encodings were used, then the instruction length would be greater since the destination address would need to be stored within the instruction as well as operand information and the opcode. Advantageously, a smaller instruction memory may be used, thereby reducing die area and therefore overall cost of the DSP.

Numerous variations and modifications will become apparent to those skilled in the art once the above disclosure is fully appreciated. It is intended that the following claims be interpreted to embrace all such variations and modifications.

What is claimed is:

1. A digital signal processor comprising:

a memory configured to store a plurality of data operands, said memory including a read address port for receiving a read address, a write address port for receiving a write address, and a write data port for receiving a first data operand for storage in a location identified by said write address; and a register coupled to receive said read address concurrent with said memory receiving said read address upon said read address port, wherein said read address is provided from a first instruction, and wherein said register is further coupled to provide said read address as said write address upon said write address port, and wherein said first data operand comprises a result of executing a second instruction, whereby a destination for said result of said second instruction is located by said first instruction.

2. The digital signal processor as recited in claim 1 wherein said second instruction is prior to said first instruction within an instruction sequence executed by said digital signal processor.

3. The digital signal processor as recited in claim 2 wherein said first instruction excludes said first data operand from a plurality of operands operated upon by said first instruction.

4. The digital signal processor as recited in claim 2 wherein said first instruction comprises a nop instruction inserted between said second instruction and a third instruction within said instruction sequence.

5. The digital signal processor as recited in claim 4 wherein a first instruction field within said third instruction which provides the address stored in said register is coded to identify a source operand for said third instruction.

6. The digital signal processor as recited in claim 5 wherein said source operand differs from said result of said second instruction.

7. The digital signal processor as recited in claim 2 wherein said first instruction includes said result of said second instruction as a source operand.

8. The digital signal processor as recited in claim 1 further comprising a second register coupled to said read address port, wherein said second register is configured to provide said read address.

9. The digital signal processor as recited in claim 8 wherein said second instruction is fetched into said second register during a first clock cycle.

10. The digital signal processor as recited in claim 9 wherein said first instruction is fetched into said register during a second clock cycle subsequent to said first clock cycle.

11. The digital signal processor as recited in claim 10 wherein said memory includes a read data port for providing one of said plurality of data operands in response to said read address, and wherein said read data port is coupled to a third register.

12. The digital signal processor as recited in claim 11 further comprising a second memory coupled to said third register, wherein said third register is configured to provide a second read address to said second memory.

* * * * *